(12) United States Patent
Efraimson (10) Patent No.: US 9,073,565 B1
(45) Date of Patent: Jul. 7, 2015

(54) LOG HAULING HAND TRUCK

(76) Inventor: David P. Efraimson, Rice, MN (US)

(*) Notice: Subject to any disclaimer, the term of this patent is extended or adjusted under 35 U.S.C. 154(b) by 1043 days.

(21) Appl. No.: 13/097,049

(22) Filed: Apr. 28, 2011

(51) Int. Cl.
  *B65F 3/26* (2006.01)
  *B62B 1/14* (2006.01)

(52) U.S. Cl.
  CPC .................................... *B62B 1/145* (2013.01)

(58) Field of Classification Search
  CPC ........ B62B 1/145; B62B 2203/10; B62B 1/14
  USPC ................................................. 414/490, 454
  See application file for complete search history.

(56) References Cited

U.S. PATENT DOCUMENTS

| | | |
|---|---|---|
| 31,741 A | 3/1861 | Humes |
| 70,303 A | 10/1867 | Whipple |
| 167,221 A | 8/1875 | Carter |
| 345,467 A | 7/1886 | Williams |
| 493,598 A | 3/1893 | Psota |
| 661,904 A | 11/1900 | Browne |
| 757,793 A | 4/1904 | Vickers |
| 851,164 A | 4/1907 | Davenport |
| 1,341,904 A | 6/1920 | Hubbard |
| 1,423,887 A | 7/1922 | Stewart |
| 1,436,173 A | 11/1922 | Hoxie |
| 1,437,971 A | 12/1922 | Gakle |
| 1,446,799 A | 2/1923 | Hunziker |
| 1,460,266 A | 6/1923 | Monroe |
| 1,467,504 A | 9/1923 | Sabarros |
| 1,470,526 A | 10/1923 | Cade |
| 1,510,456 A | 10/1924 | Cadwalader |
| 1,525,451 A | 2/1925 | Kurtz |
| 1,770,640 A | 7/1930 | Beasley |
| 2,492,364 A | 12/1949 | Levy |
| 2,576,048 A | 11/1951 | Schism |
| 2,775,465 A | 12/1956 | Swingler |
| 2,998,151 A | 8/1961 | Sampson |
| 3,913,762 A | 10/1975 | Alexander |
| 4,286,800 A | 9/1981 | Lomas |
| 4,341,393 A | 7/1982 | Gordon et al. |
| 4,375,113 A | 3/1983 | Ewert |
| 4,375,935 A | 3/1983 | Miller |
| 4,453,876 A * | 6/1984 | Arpin ............................. 414/183 |
| 4,583,904 A | 4/1986 | Maxwell |
| 4,637,769 A * | 1/1987 | Thorndike .................... 414/454 |
| 4,729,711 A * | 3/1988 | Holopainen .................. 414/454 |
| 5,017,080 A * | 5/1991 | Thorndike et al. ............ 414/454 |
| 6,086,310 A | 7/2000 | Lujan, III et al. |
| 6,364,596 B1 | 4/2002 | Spencer et al. |
| 7,172,207 B2 | 2/2007 | Henry |
| 2007/0295562 A1* | 12/2007 | Burton et al. ................. 187/233 |

* cited by examiner

*Primary Examiner* — Saul Rodriguez
*Assistant Examiner* — Emery Hassan
(74) *Attorney, Agent, or Firm* — Albert W. Watkins (57) ABSTRACT

A log hauling hand truck that acts as a log transporter and lifter has a generally planar height adjustable platform in combination with a retained and adjustable hook. A hand brake has a releasing actuator and an alternative locking actuator for selective braking by an operator. When the load platform is parallel to the ground, the log hauling hand truck is stabilized by locked wheels, a fixed stand, and handle guards, each which independently contact the ground. Roll-off preventing guards may be provided adjacent to the load surface of the adjustable height platform. The platform is preferably open and comprises an expanded metal load surface.

18 Claims, 4 Drawing Sheets

LOG HAULING HAND TRUCK

BACKGROUND OF THE INVENTION

1. Field of the Invention

This invention pertains generally to material handling apparatus, and more particularly to tilting vehicle handlers with an adjustable and movable jaw for securing a load, such as a large and heavy log, to an adjustable platform, so that the load may be easily moved by a single person between ground elevation and the elevation of a trailer or log splitter.

2. Description of the Related Art

For many persons, a controlled and recreational fire greatly enhances a social gathering, whether the gathering is very small and private or for a large group on a special occasion. The ambiance created by the warm and gentle glow of the fire combines with the mesmerizing flickering and lapping of the flames to enhance nearly all types and sizes of social gatherings. Many of these gatherings occur in the latter part of the evening or into the night, when ambient temperature will have dropped significantly from the daytime. Since each person may either move closer to or farther from the fire, each individual can effectively customize to their preferred ambient temperature as well. The warm radiance of the fire in the evening or night will then also help to keep everyone comfortably warm and relaxed.

To other persons, a fire is far more practical, and simply represents the conversion of a readily available fuel source, the wood, to heat that may be put directly to use, or that may be converted into yet other types of energy. In some cases, the wood may be burned in a fireplace that combines aesthetic benefits with utilitarian heat extraction, but the wood may alternatively simply be placed in a closed but ventilated fire chamber, and the heat may then be used for space heating, water heating, steam generation, or others of the many known utilitarian applications for the thermal energy that is generated during combustion.

Those familiar with wood fireplaces, stoves, bonfires, campfires, and the many other types of related wood combustion applications may already know that there are some important variables that must be controlled properly, depending upon the intended application and timing. For example, very small diameter twigs and sticks, such as would be smaller than a typical person's fingers in diameter, are quite light in weight. All persons, including young children and more frail individuals, can easily gather and carry this type of firewood. Twigs and small sticks also have a very large surface area to volume ratio, and when collected together, much air is entrapped between the various irregularly shaped twigs. This means that the twigs are relatively easy to ignite, and they tend to burn very bright and hot due to the readily available entrapped oxygen and large surface area. Unfortunately, the twigs and sticks will also only last for a few minutes before being entirely consumed in the flames. Consequently, this type of firewood must be gathered almost continuously to keep up with the rate of combustion. As a result, very small diameter wood is most commonly collected and used specifically for starting fires.

At the other extreme, very large diameter wood, such as the trunk from an old tree, is very hard to collect and move, and is quite difficult to ignite. However, owing to the much smaller surface area to volume ratio and almost no entrapped oxygen, such large diameter wood may burn for many hours or days. Large diameter logs may therefore be used to produce thermal energy through that same period of hours or days of combustion, without the need for any human intervention or tending. This has led to the reservation of a large diameter log or trunk which may be referred to as the night log for overnight use or other relatively unattended periods, since a large diameter log can be expected to burn through the duration of the night.

Medium diameter logs will burn for time measured as some significant fraction of an hour up to several hours, and so produce a generally preferred compromise between the twigs and large tree trunks. The aesthetic appearance of such fires is very good, and the few hours of combustion often corresponds reasonably closely with the duration of most social gatherings. Furthermore, these medium diameter logs can be lifted and moved about by most healthy individuals in the prime years of their lives. In most controlled combustion wood stoves, several of these medium diameter logs may be placed in the fire chamber, the air inlet restricted, and the wood allowed to burn again with little or no tending for hours. Consequently, the medium diameter logs are most preferred for most fire applications other than starting or long duration.

As those familiar with fireplaces and the other various wood combustion applications also already know, the wood does not itself grow and sever when at the right diameter and length, nor does it happen to fall right next to the fireplace. Consequently, wood must be gathered or harvested, prepared by drying, splitting or cutting to size, sometimes stored, and ultimately delivered to the location where the fire will be. Many land owners will maintain their wooded land by regularly harvesting downed trees and thinning overcrowded areas. In such cases, the wood is commonly cut to desired length, and then often moved and loaded manually onto a waiting truck or trailer. From the forest, the length-cut wood is then typically transported to a wood pile or other storage area, unloaded from the transport vehicle, and then dry stacked until required for a fire. Some persons will split the wood immediately, particularly where due to circumstances the wood is already dry such as a dead tree that has had plenty of drying time, but others will first stack and dry the wood, and then split it. This means that in many instances the length-cut wood will be raised from the ground to an elevated trailer or truck, transported, removed from the trailer or truck and placed onto either the stack or a splitter followed by stacking. Later, the wood will again be moved, either from the stack to a splitter and then to the fireplace, or directly from the stack to the fireplace. This means that there will be significant handling, including raising and lowering each of the large logs several times prior to gaining the benefits of the fire.

In some cases, a large tract of wooded area will be cleared, and during such a process the quantity of wood is sufficiently great to justify the use of large machinery for harvesting, cutting to length, and splitting. Nevertheless, there will still be significant manual lifting and lowering required, even in the best of circumstances.

Raising and lowering heavy and awkward objects is the cause of an enormous number of back injuries each year. Unfortunately, even with the best of modern forest harvesting equipment, there is still much heavy lifting of large and awkward logs. As may be appreciated, there is even more heavy lifting required without the modern forest harvesting equipment. Either way, there is a substantial need in the industry for better apparatus to assist in the gathering, storing, and final distribution of firewood to ease the effort required to gain the benefits that a fire has to offer, and to reduce accidental injuries associated therewith.

One way that various artisans have attempted to ease the manual handling of logs is through the use of apparatus or machinery designed to grab the logs for transport on a cart. Several of these, the contents of each which are incorporated herein by reference, are shown in U.S. Pat. No. 4,375,935 by Miller, entitled "Lifting and transporting apparatus"; U.S. Pat. No. 4,583,904 by Maxwell, entitled "Firewood handler"; and U.S. Pat. No. 2,998,151 by Sampson, entitled "Carts for moving logs into fireplaces". Each of these patents provide leveraged lifting of logs and facilitate transport. However, none may be adjusted to accommodate widely varying log dimensions, or to adjust to match the elevations of surrounding surfaces that the log might desirably be transferred to, such as a log splitter or trailer.

Other carts designed to facilitate the support and transfer of logs are illustrated in U.S. Pat. No. 4,341,393 by Gordon et al, entitled "Hand cart"; U.S. Pat. No. 4,453,876 by Arpin, entitled "Fireplace log and coal feeder"; and U.S. Pat. No. 4,637,769 by Thorndike, entitled "Log carrier", the teachings and contents of each which are incorporated herein by reference, though these prior art log carts lack many desirable features and benefits.

Additional hand trucks having adjustable hooks are incorporated herein by reference for their teachings and contents, including U.S. Pat. No. 757,793 by Vickers, entitled "Adjustable hook for hand trucks"; U.S. Pat. No. 851,164 by Davenport, entitled "Hand truck"; and U.S. Pat. No. 1,470,526 by Cade, entitled "Truck". While these adjustable hooks represent substantial advancement over fixed hooks, the Vickers hook is relatively difficult to use and may be prone to part slippage and accidental release. The Davenport hook has an exposed release that, if accidentally pressed during operation of the present log hauling hand truck, would be very detrimental and potentially seriously harmful. Finally, the Cade apparatus, while simple and effective, is free to separate from the hand truck, making it somewhat more awkward to adjust and easier to misplace than desired herein.

The teachings and contents of a number of additional hand trucks not specifically designed for handling logs are incorporated herein by reference, including U.S. Pat. No. 31,741 by Humes, entitled "Hand truck"; U.S. Pat. No. 70,303 by Whipple, entitled "Hand truck"; U.S. Pat. No. 167,221 by Carter, entitled "Trucks for moving rails, etc."; U.S. Pat. No. 345,467 by Williams, entitled "Barrel truck"; U.S. Pat. No. 1,436,173 by Hoxie, entitled "Dumping truck"; U.S. Pat. No. 1,437,971 by Gakle, entitled "Truck"; U.S. Pat. No. 1,446,799 by Hunziker, entitled "Truck"; U.S. Pat. No. 1,460,266 by Monroe, entitled "Hand truck"; U.S. Pat. No. 1,510,456 by Cadwalader, entitled "Truck"; U.S. Pat. No. 1,525,451 by Kurtz, entitled "Method and apparatus for transferring cylindrical glass sections"; U.S. Pat. No. 2,576,048 by Schum, entitled "Truck for handling cylinders of compressed gas or the like"; U.S. Pat. No. 2,775,465 by Swingler, entitled "Portable cart"; U.S. Pat. No. 3,913,762 by Alexander, entitled "Combination hand and lift cart"; U.S. Pat. No. 4,286,800 by Lomas, entitled "Trailer"; U.S. Pat. No. 4,375,113 by Ewert, entitled "Beehive superstructure transport apparatus"; U.S. Pat. No. 6,086,310 by Lujan et al, entitled "Wheeled multipurpose keg handler"; U.S. Pat. No. 6,364,596 by Spencer et al, entitled "Hay bale cart"; and U.S. Pat. No. 7,172,207 by Henry, entitled "Collapsible cart".

A number of additional patents that are exemplary of prior art limitations with elevating heavy loads onto trailers or other elevated platforms are also incorporated herein by reference in entirety, including U.S. Pat. No. 493,598 by Psota, entitled "Wagon loading device"; U.S. Pat. No. 661,904 by Browne, entitled "Truck loading machine"; U.S. Pat. No. 1,341,904 by Hubbard, entitled "Loading skid"; U.S. Pat. No. 1,423,887 by Stewart, entitled "Truck loading and unloading mechanism"; U.S. Pat. No. 1,467,504 by Sabarros, entitled "Apparatus for the mechanical handling of goods"; U.S. Pat. No. 1,770,640 by Beasley, entitled "Loading apparatus"; and U.S. Pat. No. 2,492,364 by Levy, entitled "Self-loading vehicle". Webster's New Universal Unabridged Dictionary, Second Edition copyright 1983, is additionally incorporated herein by reference in entirety for the definitions of words and terms used herein.

SUMMARY OF THE INVENTION

Exemplary embodiments of the present invention solve inadequacies of the prior art by providing, in a first manifestation, a log hauling hand truck having a generally planar platform in combination with a contained and adjustable hook. In a second manifestation, the invention is a log transporter and lifter having an adjustable height platform. In further manifestations, the invention has a stable unload position, including locked wheels, fixed leg and handle guards; a hand brake including a releasing brake and a locking brake; roll-off preventing guards; and an expanded metal platform that bites into logs and discharges moisture and debris.

OBJECTS OF THE INVENTION

A first object of the invention is to enable a level transfer between a log hauling hand truck and a diverse apparatus such as a trailer or log splitter. A second object of the invention is to enable adjustment of the platform surface of the log hauling hand truck to be co-planar with or closely correspond to the plane of the diverse apparatus. A further object of the invention is to enable adjustment of a log hook to accommodate widely diverse log diameters, without the need for tools and without the chance of lost parts or accidental slip or disengagement. Another object of the present invention is to enable alternative braking methods, one a locking brake and the other a force-sensitive releasing brake. Yet another object of the invention is to facilitate rapid and yet physically more safe manual movement, loading, and unloading of large logs from diverse apparatus.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Log hauling hand truck 1 has a base 10 that may traverse a ground surface through wheel set 20. Handles 30 couple with base 10 and allow base 10 to be pivoted in a vertical plane about axle 26, allowing hand truck 1 to be lifted for transport by grasping handles 30 at each hand grip 32, 33 and lifting. A pintle, bushing or wheel bearing 24 is preferably provided, allowing pneumatic, semi-pneumatic, or solid tires 22 to rotate thereabout relative to axle 26, or, if so desired, allowing tires 22 and axle 26 to rotate relative to base 10. Either way, base 10 will rotate relative to tires 22 about an axis defined by axle 26.

Base 10 may be relatively open as illustrated in the preferred embodiment hand truck 1, comprising the two opposing vertical panels 12, 14. This open design allows excellent discharge of matter, dirt and moisture, and improved access for inspection, cleaning, and maintenance. Alternatively, a more extensive box of four vertical panels or any other arrangement may be provided, so long as base 10 provides sufficient strength to support any load placed upon log support platform 40. Platform 40 in the preferred embodiment hand truck 1 has an expanded metal platform surface 41 which will engage with any logs pressed there against or carried thereupon. Those familiar with expanded metal know that the surface combines openings with edges that will bite into softer materials, ensuring good engagement between platform surface 41 and any transported logs, such as log 2 illustrated in FIG. 2. Furthermore, the openings inherent within expanded metal will ensure that any water, dirt or debris that might otherwise accumulate may be shed easily.

Figure 1:
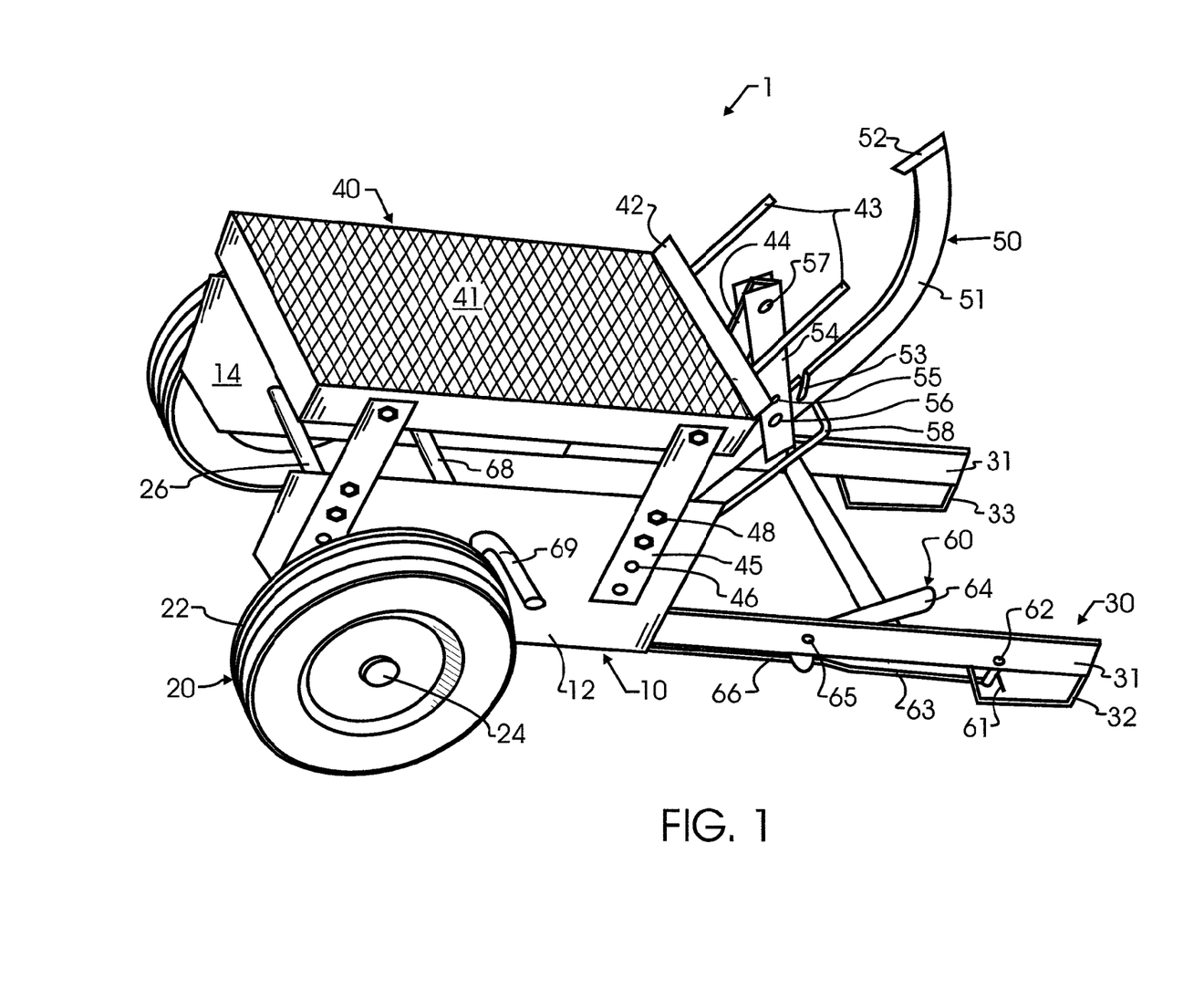
FIG. 1 illustrates a preferred embodiment log hauling hand truck, having the support platform parallel to the ground, from projected view.

Platform 40, when parallel to the ground as illustrated for exemplary purposes in FIG. 1, will preferably be sufficiently large to easily support even the largest logs 2 that may be expected. However, the ground that hand truck 1 rests upon may not always be level, and so a border stop 42 may be provided adjacent to one or more edges of platform surface 41, most preferably only along the edge most nearly adjacent to hand grips 32, 33. Further elongated border stops 43 may also be provided. These border stops 42, 43 prevent a log from rolling across platform surface 41 and falling onto handles 30, and thereby prevent any chance of operator injury due to an unexpected log roll.

The height of platform surface 41 is adjustable relative to the ground by selecting which holes 46 in vertical platform support members 45 to pass fasteners 48 through. As illustrated, platform 41 is set as close to the ground as available, leaving two open holes 46 below the two holes 46 having fasteners 48 passing through. By removing fasteners 48 and raising platform surface 41 until the bottom two holes 46 come in line with fasteners 48, the platform may be raised by an amount equal to twice the spacing between holes 46. It will be understood herein that while four holes 46 are illustrated in each vertical platform support member 45, the exact count and spacing of holes is not critical to the present invention. Nevertheless, the ability to adjust the height of platform 41 is very beneficial, whether by the fasteners illustrated or other means or methods which will be understood herein to include any of the myriad of mechanical devices known in the hardware and fastener arts to accomplish such support and positional adjustment.

Figure 2:
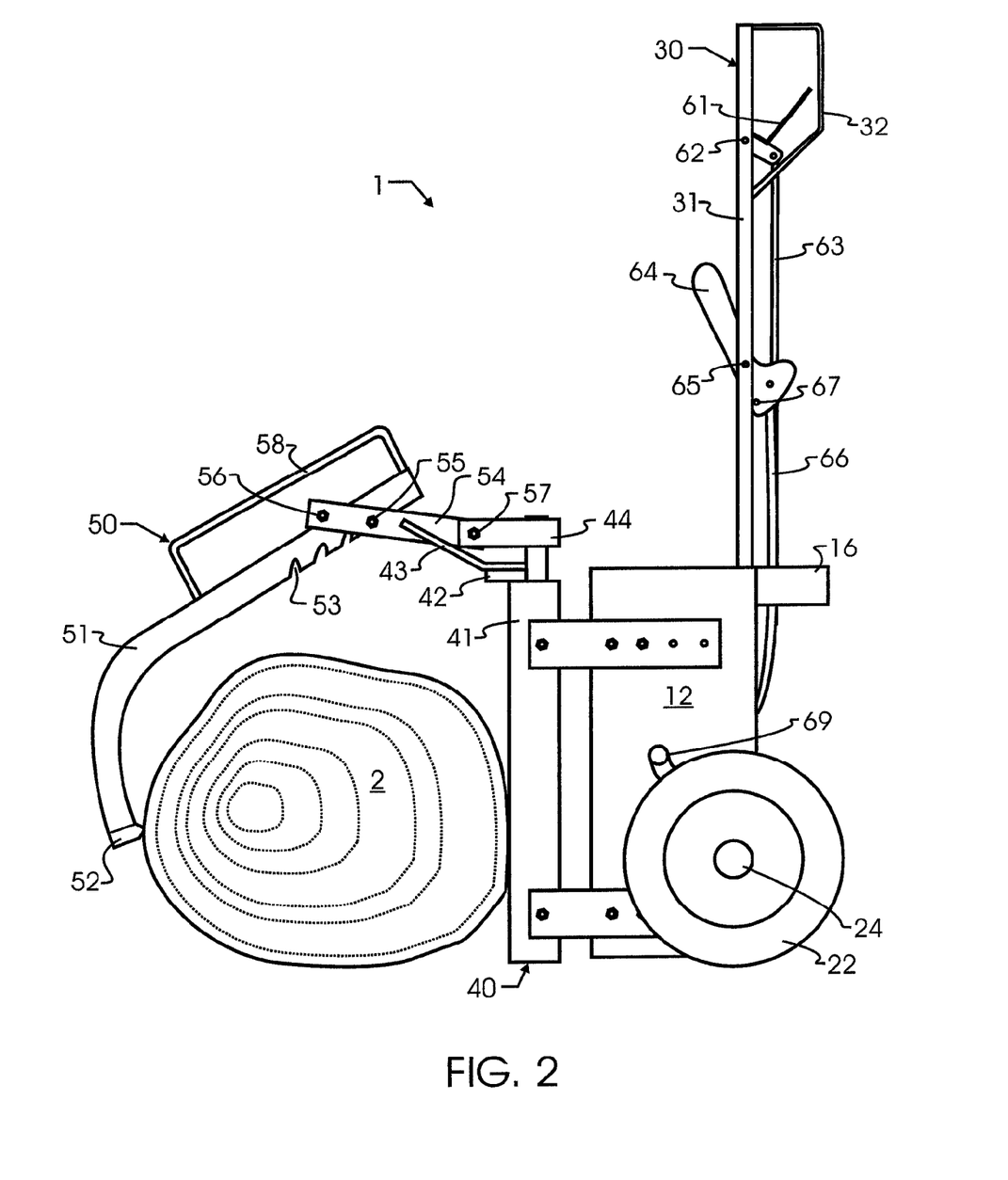
FIG. 2 illustrates the preferred embodiment log hauling hand truck of FIG. 1 rotated such that the support platform is perpendicular to the ground, and with a log supported thereon, from a side elevational view.

Referring to FIG. 2, a log 2 may be picked up from the ground by pivoting adjustable grappling and retention hook 50 down and around log 2, and engaging piercing tooth 52 in log 2. This position illustrated in FIG. 2 allows handles 30 to next be pivoted, clockwise in the illustration of FIG. 2, about wheel bearing 24 and axle 26, thereby lifting log 2 off of the ground. Handles 30 may be rotated clockwise until they contact the ground at hand grips 32, 33, which also preferentially causes base fixed leg 16 to engage the ground, if log 2 only requires elevating. Should log 2 also need to be transported, the operator will preferably support handles 30 at some angle between parallel and normal to the ground, or some intermediate point between the illustrations of FIGS. 1 and 2. In so doing, the entire hand truck 1 and log 2 will be supported upon the two wheels 22, and so hand truck 1 and log 2 may easily be rolled across the ground to another location. The force required to lift log 2 is reduced by the ratio of length of handle extensions 31 between hand grips 32, 33 and wheel bearing 24 to the distance between wheel bearing 24 and log 2 on platform surface 41. Consequently, great mechanical advantage is available, allowing a person who could never lift log 2 to raise it without dangerous physical stress or risk of injury.

Adjustable grappling and retention hook 50 is coupled through pintle 57 to vertical platform connection member 44 and pivots about pintle 57. Furthermore, bifurcated member 54 surrounds notches 53, and a generally cylindrical fastener 55 passes first through a first fork of bifurcated member 54, then through notch 53, and then through the second or other fork of bifurcated member 54. A second fastener 56 passes through both forks of bifurcated member 54, and between u-shaped handle 58 and notches 53 of hook arm 51. Since handle 58 is connected at both ends to hook arm 51, fastener 56 will remain therein, ensuring that bifurcated member 54 always stays coupled to hook arm 51. However, there is preferably enough space between fasteners 55 and 56 that fastener 55 will only fall into notches 53 when arm 51 is adjacent to bifurcated member 54 is nearly parallel therewith, such as in the illustrations of FIGS. 2 and 5. When hook arm 51 is shifted to more perpendicular to bifurcated member 54, such as in the illustration of FIG. 1, then the particular notch 53 that fastener 55 passes through may easily be changed. Consequently, the distance between piercing tooth 52 and pintle 57 is adjustable depending upon which notch 53 fastener 55 passes through, thereby allowing retention hook 50 to accommodate larger or smaller diameter logs 2.

Figure 3:
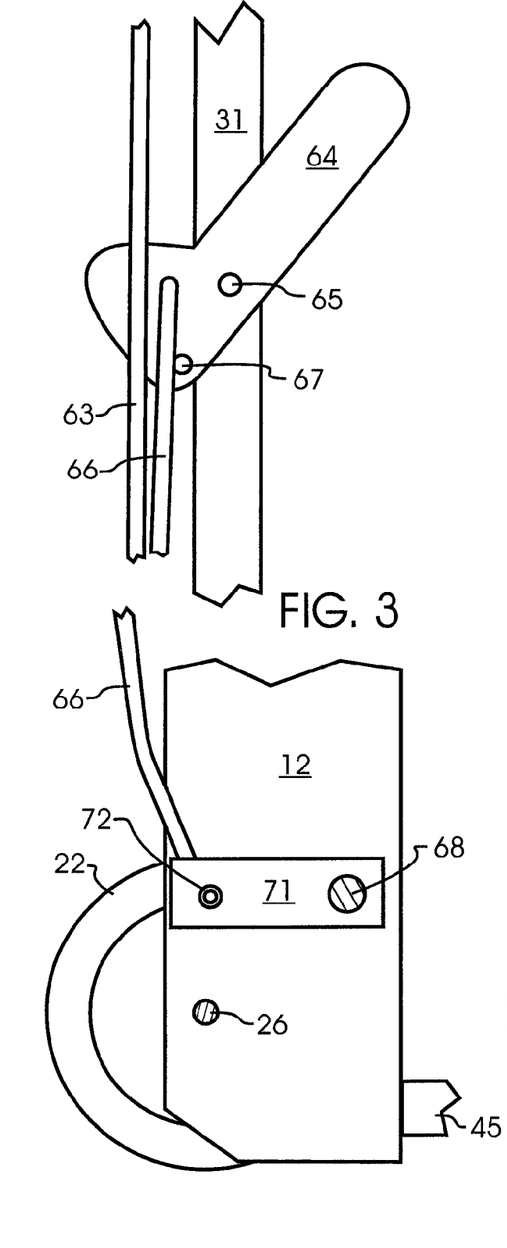
FIGS. 3 and 4 illustrate a preferred locking brake apparatus from an inside elevational view looking outwards, in alternative unlocked and locked postilions, respectively.

Particularly when loading or unloading logs 2 from platform surface 41, there will be many times where hand truck 1 will preferably stay put relative to the ground. While hand grips 32 and 33 and base fixed leg 16 will each engage the ground, a brake assembly 60 will also preferably be provided to prevent rotation of wheels 22 about wheel bearing 24. In the preferred embodiment, brake assembly 60 includes a manual, force sensitive handle 61 that pivots about pintle 62 and thereby pulls rod 63 up when squeezed. FIG. 3 shows rod 66, to which rod 63 is coupled, in the released position of FIGS. 1-3. In this position, coupling member 71 is essentially horizontal. Coupling member 71 is coupled through pintle 72 to rod 66, but is rigidly coupled to brake axle 68 such as by welding or other suitable technique. Consequently, when brake handle 61 is squeezed and rotated about pintle 62, this causes coupling member 71 to rotate, similar to the rotation illustrated in FIG. 4. This in turn causes tire brake 69 to engage with tire 22, similar to that illustrated in FIG. 5. As may be apparent, as soon as brake handle 61 is released, tire brake 69 will release from tire 22.

Figure 4:
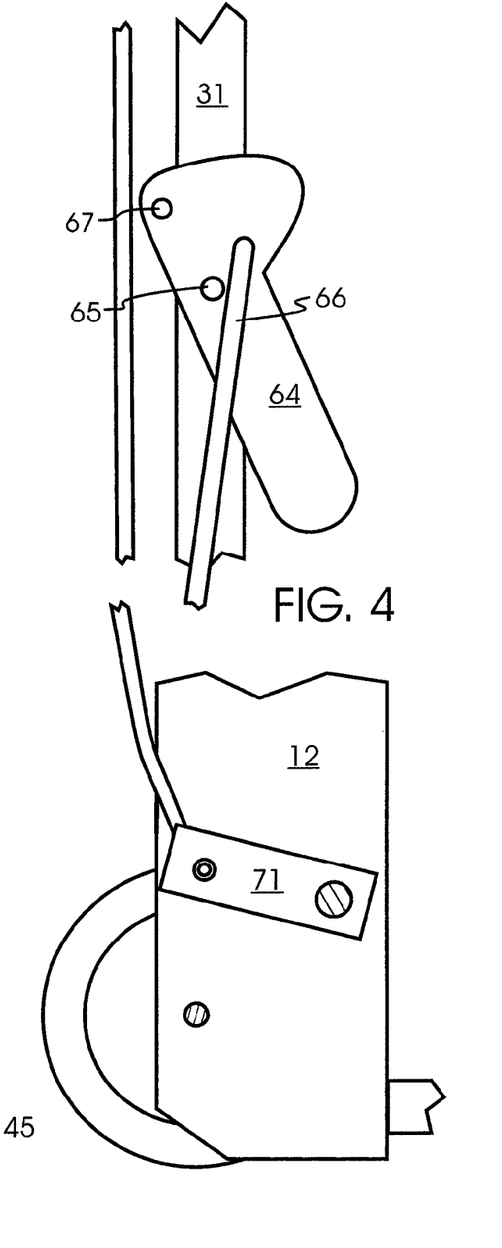

Brake handle 61 is useful when an operator is holding handles 30 and moving hand truck 1 about. However, when loading and unloading log 2, a brake lock is preferred that maintains tire brake 69 engaged with tire 22. This is accomplished using over center brake lock 64, the motion which is best illustrated in FIGS. 3 and 4. Brake lock 64 is supported upon handle extension 31 and pivots with respect thereto on pintle 65. Rod 66 is pivotally coupled to brake lock 64 at a termination of rod 66 distal to coupling member 71. Finally, a pivot stop 67, which may for exemplary purposes be a protruding bolt, rod or the like, interferes with or engages with handle extension 31 at two opposed extremes of rotation of brake lock 64. In the illustration of FIG. 3, brake lock 64 is released, and pivot stop 67 is generally between pintle 72 and pintle 65. In the other brake lock rotation extreme illustrated in FIG. 4, pivot stop 67 is no longer between, and is instead beyond pintle 65. Since, in the extreme rotation of FIG. 4, the termination of rod 66 is now to the right or forward of pintle 65, any tension thereon holds brake lock 64 in this position. Likewise, in the other extreme rotation of FIG. 3, any tension on rod 66 will hold brake lock 64 in that position. In other words, there are two naturally stable positions for brake lock 64, the two positions illustrated in FIGS. 3 and 4. This means that brake lock 64 may be set in the brake release position of FIG. 3, or the brake engaged position of FIG. 4, and brake lock 64 will remain as set until an operator manually changes the position by intentionally rotating brake lock 64.

Figure 5:
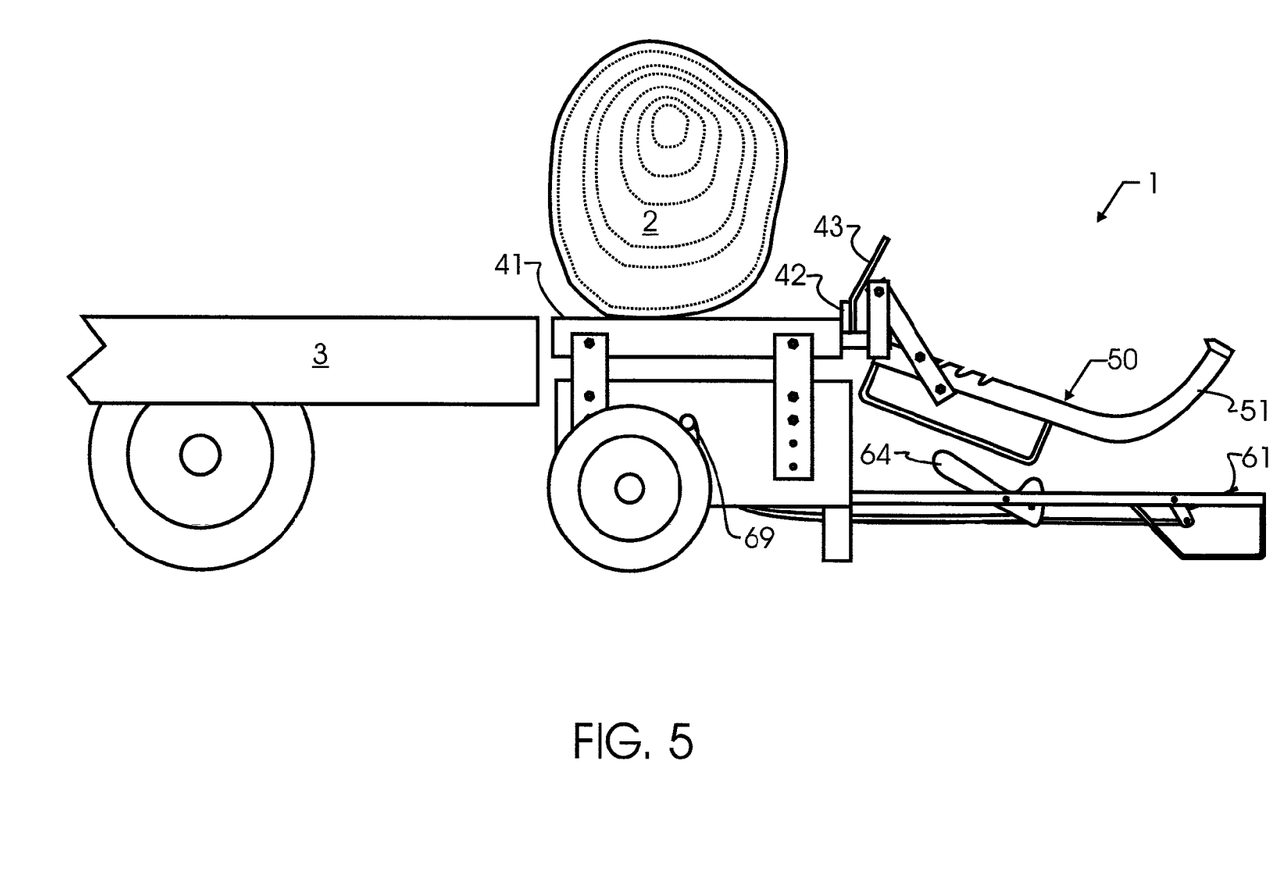
FIG. 5 illustrates the preferred embodiment log hauling hand truck of FIG. 1 in further combination with an adjacent trailer, and with a log supported thereon, from a side elevational view.

FIG. 5 illustrates the loading or unloading of a log 2 from platform surface 41 to a trailer 3, as illustrated, though it will be understood that a log splitter or any other elevated surface may be substituted for trailer 3. Most preferably, platform surface 41 is height adjusted through vertical platform support members 45, holes 46, and fasteners 48 to be very close in elevation to the top surface of trailer 3. There are no bumps, protrusions or any other obstacles between the immediately adjacent platform surface 41 and generally planar surface of trailer 3. In this way, log 2 may be directly rolled from platform surface 41 to trailer 3 or from trailer 3 to platform surface 41, with minimal or without any manual lifting or with very minimal pushing or rolling force required.

From FIG. 5 it is also more apparent that should log 2 roll towards border stops 42, 43, border stops 42, 43 will prevent log 2 from rolling off. Furthermore, as log 2 gets more nearly adjacent to border stops 42, 43, the load of log 2 will shift from entirely upon wheels 2 to divided between wheels 22, base fixed leg 16, and hand grips 32, 33.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A log hauling hand truck facilitating grasping logs from a ground surface, elevating said logs, and transferring said logs to a surface elevated from said ground surface, and similarly receiving logs from said elevated surface, lowering said logs to said ground surface, and releasing said logs to said ground surface, comprising:
   a base;
   a wheel set supporting said base upon said ground;
   at least one handle extending from said base and in combination with said wheel set generally defining a handle plane;
   a generally planar platform surface generally parallel to and displaced from said handle plane, said generally planar platform surface supported upon said base and terminating said log hauling hand truck distal to said at least one handle;
   said generally planar platform surface that operatively bites into a log while simultaneously discharging moisture and debris, and that is supported upon said base and terminating said log hauling hand truck distal to said at least one handle;
   a means for adjusting a perpendicular distance between said generally planar platform surface and said handle plane to operatively align said generally planar platform surface co-planar with said elevated surface when said handle plane is generally parallel to said ground surface; and
   a pivotal, retained and length-adjustable hook operatively capturing said log between said hook and said platform surface.

2. The log hauling hand truck of claim 1, further comprising a locking brake disabling rotation of at least one wheel within said wheel set.

3. The log hauling hand truck of claim 2, operatively having a stable transfer position facilitating transfer of said logs between said generally planar platform surface and said elevated surface, further comprising:
   a fixed leg supporting said base upon said ground in said stable transfer position; and
   at least one handle guard supporting said base upon said ground in said stable transfer position;
   said locking brake further disabling rotation of said at least one wheel within said wheel set in said stable transfer position.

4. The log hauling hand truck of claim 2, further comprising:
   a manual, force sensitive and self-releasing brake;
   said locking brake further comprising an over-center brake lock.

5. The log hauling hand truck of claim 1, further comprising at least one border stop terminating and protruding from said generally planar platform surface adjacent to said at least one handle, said border stop inhibiting said logs from rolling off said generally planar platform surface adjacent to said at least one handle.

6. The log hauling hand truck of claim 1, wherein said generally planar platform surface further comprises an expanded metal platform that operatively bites into a log while simultaneously discharging moisture and debris.

7. A log transporter and lifter facilitating elevating logs from a ground surface and transferring said logs to a surface elevated from said ground surface, comprising:
   a base;
   a wheel set supporting said base upon said ground;
   at least one handle extending longitudinally from said base and defining a longitudinal axis;
   a generally planar platform surface supported upon said base and terminating said log hauling hand truck distal to said at least one handle; and
   said generally planar platform surface that operatively bites into a log while simultaneously discharging moisture and debris, and that is supported upon said base and terminating said log hauling hand truck distal to said at least one handle; and
   a means for adjusting a distance perpendicular to said handle longitudinal axis between said generally planar platform surface and said wheel set adapted to operatively align said generally planar platform surface co-planar with said surface elevated from said ground surface when said handle longitudinal axis is generally parallel to said ground surface.

8. The log transporter and lifter of claim 7, further comprising a pivotal, retained and length-adjustable hook operatively capturing said log between said hook and said platform surface.

9. The log transporter and lifter of claim 7, further comprising a locking brake disabling rotation of at least one wheel within said wheel set.

10. The log transporter and lifter of claim 9, further comprising:
    a fixed leg supporting said base upon said ground and defining a stable transfer position when said handle longitudinal axis is generally parallel to said ground surface; and at least one handle guard supporting said base upon said ground in said stable transfer position;

said locking brake further disabling rotation of said at least one wheel within said wheel set in said stable transfer position.

11. The log transporter and lifter of claim 9, further comprising:
a manual, force sensitive and self-releasing brake;
said locking brake further comprising an over-center brake lock.

12. The log transporter and lifter of claim 7, further comprising at least one border stop terminating and protruding from said generally planar platform surface adjacent to said at least one handle, said border stop inhibiting said logs from rolling off said generally planar platform surface adjacent to said at least one handle.

13. The log transporter and lifter of claim 7, wherein said generally planar platform surface further comprises an expanded metal platform that operatively bites into a log while simultaneously discharging moisture and debris.

14. A log transporter, lifter and transfer apparatus facilitating grasping logs from a ground surface, elevating said logs, and from a stable transfer position transferring said logs to a surface elevated from said ground surface, and similarly receiving logs from said elevated surface, lowering said logs to said ground surface, and releasing said logs to said ground surface, comprising:
a base;
a fixed leg supporting said base upon said ground in said stable transfer position;
a wheel set supporting said base upon said ground;
a locking over-center brake disabling rotation of at least one wheel within said wheel set in said stable transfer position;
a manual, force sensitive and self-releasing brake;
at least one handle extending from said base;
at least one handle guard terminating said handle distal to said base and at least in part supporting said base upon said ground in said stable transfer position;
a generally planar expanded metal platform surface that operatively bites into a log while simultaneously discharging moisture and debris, and that is supported upon said base and terminating said log hauling hand truck distal to said at least one handle;
at least one border stop terminating and protruding from said generally planar platform surface adjacent to said at least one handle, said border stop inhibiting said logs from rolling off said generally planar platform surface adjacent to said at least one handle;
a pivotal, retained and length-adjustable hook operatively capturing said log between said hook and said platform surface; and
a means for adjusting a distance between said generally planar platform surface and said ground surface in said stable transfer position to operatively align said generally planar platform surface co-planar with said surface elevated from said ground surface.

15. The transporter, lifter and transfer apparatus of claim 1, wherein said pivotal, retained and length-adjustable hook further comprises:
a hook arm having at least one notch adjacent a first end of said hook arm;
a piercing tooth terminating said hook arm at a second end of said hook arm distal to said first end;
a hook arm handle secured to said hook arm at first and second spaced points intermediate to said first and second ends and defining a fully encompassed opening there between;
a bifurcated member having a first fork passing on a first side of said hook arm, and a second fork passing on a second side of said hook arm generally opposed to said first side of said hook arm;
a generally cylindrical fastener passing through said first fork of said bifurcated member, through said at least one notch, and through said second fork of said bifurcated member and defining a pivotal connection between said bifurcated member and said hook arm;
a second fastener passing through said first and second forks of said bifurcated member, and between said hook arm handle and said hook arm within said fully encompassed opening and thereby ensuring that bifurcated member always stays coupled to said hook arm; and
a pintle pivotally coupling said pivotal, retained and length-adjustable hook to said generally planar expanded metal platform surface.

16. The transporter, lifter and transfer apparatus of claim 15, wherein said at least one notch further comprises:
a first notch and a second notch spaced along said hook arm from said first notch;
said generally cylindrical fastener and said second fastener spaced sufficiently from each other that said generally cylindrical fastener will only fall into said first and second notches when said hook arm adjacent to said bifurcated member is nearly parallel therewith, and when nearly perpendicular therewith will be removed from said first and second notches, wherein the distance between said piercing tooth and said pintle is adjustable depending upon which of said first and second notches said generally cylindrical fastener passes through.

17. The log hauling hand truck of claim 1, wherein said pivotal, retained and length-adjustable hook further comprises:
a hook arm having at least one notch adjacent a first end of said hook arm;
a piercing tooth terminating said hook arm at a second end of said hook arm distal to said first end;
a hook arm handle secured to said hook arm at first and second spaced points intermediate to said first and second ends and defining a fully encompassed opening there between;
a bifurcated member having a first fork passing on a first side of said hook arm, and a second fork passing on a second side of said hook arm generally opposed to said first side of said hook arm and closed about said hook arm within said fully encompassed opening and thereby ensuring that bifurcated member always stays coupled to said hook arm;
a fastener passing through said first fork of said bifurcated member, through said at least one notch, and through said second fork of said bifurcated member and defining a pivotal connection between said bifurcated member and said hook arm; and
a pintle pivotally coupling said pivotal, retained and length-adjustable hook to said generally planar platform surface.

18. The log hauling hand truck of claim 17, wherein in said at least one notch further comprises:
a first notch and a second notch spaced along said hook arm from said first notch;
said fastener adapted to operatively only fall into said first and second notches when said hook arm adjacent to said bifurcated member is nearly parallel therewith, and when nearly perpendicular therewith operatively removed from said first and second notches, wherein the distance between said piercing tooth and said pintle is adjustable depending upon which of said first and second notches said fastener passes through.

\* \* \* \* \*